United States Patent [19]

Bilow

[11] 3,758,630
[45] Sept. 11, 1973

[54] METHOD OF PREPARING RESIN COMPOSITIONS

[75] Inventor: Norman Bilow, Los Angeles, Calif.

[73] Assignee: Hughes Aircraft Company, Culver City, Calif.

[22] Filed: Jan. 7, 1971

[21] Appl. No.: 194,779

Related U.S. Application Data

[63] Continuation-in-part of Ser. No. 665,284, Sept. 5, 1967, abandoned.

[52] U.S. Cl................. 260/823, 106/274, 106/275, 260/2 H, 260/28.5 AS
[51] Int. Cl............................................ C08g 49/04
[58] Field of Search.................... 260/2 H, 28, 28.5, 260/823

[56] References Cited

UNITED STATES PATENTS 3,555,108  1/1971  Bilow et al.......................... 260/823

Primary Examiner—Theodore Morris
Attorney—W. H. MacAllister, Jr. and Alton V. Oberholtzer

[57] ABSTRACT

Polyphenylene resin compositions of fused and non-fused aromatic ring compounds containing an aromatic curing agent in combination with other resinous modifying and forming material, with or without insoluble polymers, and method.

9 Claims, No Drawings

METHOD OF PREPARING RESIN COMPOSITIONS

This application is a continuation-in-Part of Ser. No. 665,284, filed Sept. 5, 1967, now abandoned.

The invention herein described was made in the course of or under a contract or subcontract thereunder with the Department of the Navy.

The present invention relates to a discovery of the method of preparing curable fusible and soluble composite aromatic resinous compositions including modifications thereof and particularly aromatic polymers of fused and unfused ring polyphenylene material fusible and soluble in halogenated solvents and curing agent combination containing modified or modifying constituent material with or without intractable polymers of polynuclear aromatic resins, and the products thereof. More particularly, this discovery relates to and is exemplified by modifying soluble aromatic polymers, polyphenylene polymers of biphenyl, terphenyls, isomers thereof, and mixtures of said compounds for use in the preparation of powder, liquid, and plastic resin compositions for coatings, laminations, or in forming molded structures of high strength and high thermal stability, including modifications thereof. In many instances, the prior art resins have been entirely unsuitable for the purpose of making laminated, or molded structures, or for protective coatings having high thermal stability. The reason for this unsuitability is that the prior art resins have either been of low molecular weight and consequently have had low fusion or softening points and poor thermal stability, or they have been substantially infusible and insoluble in organic solvents, or they have not been known to be capable of thermosetting. In the case of low molecular weight products of the prior art, no means had previously been available to cure these materials and convert them into useful infusible and insoluble products during fabrication. In other words, many of the prior art low molecular weight resins, remained permanently fusible. It has also been known to the art that infusible, insoluble, intractable, resinous material has formerly been comparatively useless for thermosetting fabrication.

The insoluble and infusible prior art resins could not be fabricated or otherwise utilized because fabrication requires that the resinous material flow and thermoset to take the shape of a mold, or to flow sufficiently to become a homogeneous binder, or to be soluble in a solvent so that fillers, or fibers can be coated or that lacquers can be prepared therewith.

Further, some of the prior art fusible phenylene polymers owed their fusibility to the presence of aliphatic groups such as alkyl groups or olefinic groups in the polymer. Often these aliphatic groups were formed during the course of a polymerization and the reduced polymer thus has carbon:hydrogen ratios of significantly less than 1.4.

Completely para-polyphenylenes have been obtained by several investigators and molecular weights were reported to be as high as 5,000 to 10,000. Completely para polymers are, however, entirely infusible and relatively insoluble in conventional solvent material. Infusibility of a phenylene polymer almost always occurs anytime a polymer chain segment occurs in which there are more than eight or nine phenylene groups linked in the para position. As a consequence, fusible para-polyphenylenes of high molecular weight cannot be obtained. This is theoretically due to the extremely strong van der Waals forces which the linear molecular structure allows. The new disclosure herein now provides a method of use and application for such relatively insoluble polymers.

Further illustrative of the insoluble and intractable polymers of polyphenylenes were those obtained from the hot solvent extracted polymers as derived from the following runs as disclosed in the above indicated patent application.

EXAMPLE A

A mixture of m-terphenyl (230 g., 1.0 mole), biphenyl (77 g., 0.5 mold), benzene (55 g., .7 mole), and anhydrous cupric chloride (807 g., 6.0 mole) is prepared and heated to 165°C in an oil bath. While stirring continuously anhydrous aluminum chloride (187 g.) is gradually added to the reaction mixture over a 2-hour period. The mixture is then cooled, pulverized, and additional aluminum chloride (67 g.) is added. It is then reheated at 165°C for an additional 45 minutes.

The crude polymer is thoroughly cleaned by treatment with concentrated hydrochloric acid, 6 N hydrochloric acid, and finally water. After drying the product weighs 355 grams. Unreacted monomers and low molecular weight oligomer (210 grams) were extracted from the crude polymer by continuous extraction with hot benzene. Continuous extraction of the residue with hot bromobenzene yields polymer (69 g.) having a mean molecular weight of about 1500 and melting at 190°-220°C. If 1,2,4-trichlorobenzene is used in the second extraction, however, the yield of polymer is 90-100 grams, has a mean molecular weight of about 2,000, and melts at 220°-250°C.

EXAMPLE B

A mixture of ortho-terphenyl (200 g., 0.87 mole) and anhydrous cupric chloride (234 g., 1.74 mole) was heated to 150°C while stirring continuously. Anhydrous aluminum chloride (116 g.) was added periodically over a two-hour period while maintaining the temperature at 150° ± 10°C. Additional cupric chloride (117 g., 0.87 mole) was then added in portions over the next three hours while maintaining the temperature at 160° ± 10°C. Upon completion of the reaction, the crude product was thoroughly washed with concentrated hydrochloric acid, then dilute acid, and finally water. After drying, the crude polymer was continuously extracted with boiling benzene in a Soxhlet extractor for 4 days. This procedure removes low molecular weight products. After completion of the benzene extraction, the crude polymer was continuously extracted with boiling 1,2,4-trichlorobenzene. That polymer fraction which was soluble in the trichlorobenzene weighed 67 grams (33 percent yield) and melted at 220°-240°C.

The nonextractable polymers are the by-product nonsoluble polymers.

Prior art polyphenylene resins have also been produced from Wurtz-Fittig and other synthesis proceedures from nitrogen-containing aromatic compounds through reactions such as diazotizations or nitrosations. Resins and polymers of these types invariably contain nitrogen or other substitutents and the materials exhibit thermal stabilities far inferior to the full aromatic polyphenylenes. Although unusable, as such, in many applications requiring greater heat stability, it has now been discovered that resins and polymers of this character may be combined with the thermosetting mixtures of fusible polyphenylenes and curing agent therefor, as herein provided.

For many applications in the art of molding and fabricating structures having high thermal stability, it is essential to use a high-temperature-stable polymer which has an intrinsically high molecular weight or which may be cross-linked, cured, vulcanized, and the like, to produce a high molecular weight (or an infinite molecular weight) during the said molding and fabrication process. At the same time, it is essential that the polymer be fusible or capable of flow under the conditions of heat and pressure that are used in the said molding and fabrication process and that the uncured polymer be soluble in suitable solvents so that fillers, fibers and the like can be intimately coated with the polymer mixture prior to the said molding and fabrication process.

The otherwise intractable and infusible higher polymeric polyphenylenes and the like can now be used to obtain thermosetting compositions when they are mixed with the curable polyphenylene polymers, as embodied herein. Mixtures may be prepared in any proportion desired, dependent upon the relative hardness and molding parameters desired. Further, the mixtures, as herein contemplated and depicted can be made useful in commercial thermosetting application with fusible and tractable thermosetting polyphenylene polymers and curing agent therefor, to convert the mixture into useful infusible and insoluble products during thermosetting fabrication.

In a copending application disclosure, Ser. No. 349,770 (now abandoned), and replaced by applications Ser. Nos. 665,262, now abandoned, 665,303, now abandoned, and 665,308, now U.S. Pat. No. 3,595,811, there are disclosed soluble and tractable polyphenylene polymers and method of production thereof, including the preparation of composite resin compositions therefrom which are curable and are utilizable in the uncured state herein. The fusible and soluble phenylene polymers disclosed therein, including the soluble and fusible polyphenylenes disclosed in the continuation-in-part application entitled, "Commercially Useful Polyphenylene Polymers and Method of Production Thereof," Ser. No. 665,262, cofiled herewith in co-inventorship with Leroy J. Miller, are applicable herein in providing the soluble and tractable polyphenylene polymers of the character desirably utilized herein. Further, curable composite mixed or modified polyphenylene resin compositions may be prepared by incorporating the modifying or modifier material with the soluble and fusible curable compositions obtained by the process of the copending application "Method of Providing Useful Heat-Setting Aromatic Polymer Resinous Compositions and Products," Ser. No. 665,578, now U.S. Pat No. 3,555,108, in which I am co-inventor with Leroy J. Miller, included herein by reference thereto. The infusible, insoluble phenylene polymers produced by the above method were preferably separated in the said disclosure, or not otherwise utilizable by any other method known to the art to produce fabricated structures by conventional molding or coating and laminating techniques. The discovery that comparatively insoluble and infusible polyphenylenes can now be usefully utilized, including the advantages of improving upon the thermosetting character of the thermoplastic material and the method therefor is the primary purpose of this new disclosure.

It is very important that the soluble and fusible branched polyphenylene resins of the present invention be produced by an overall process as disclosed herein and in the above application. The materials and processing therein and in the continuation application thereof, are incorporated herein by reference thereto. This provides for products which are essentially fully aromatic, fusible and tractable polyphenylene polymers with no significant production of intractable and infusible polymers, or, amount of reduced ring character.

a. However, in the event that the addition of more or less significant amounts of one or more of the infusible and intractable polymers, or other material as indicated, are desired to be added, or be incidentally or natrually occuring* (*In explanation, it should be pointed out that if the intractable polymer was formed during the preparation of the fusible and soluble polyphenylene, the amount of intractable polymer which can be left therein is quite limited. This is attributed to the fact that an intermediate fraction or polymer, with solubility properties between the soluble and intractable fractions is generally formed simultaneously and this intermediate fraction can be swellable, but not actually soluble. This is why fractionation was being used. Thus, swelling occurs in lacquers and the melt-flow characteristics of the polymer are much poorer. When the intractable polyphenylene contains no solvent swellable phase it can be incorporated into the thermosetting polyphenylene lacquers without producing the swelling effect and it then does not interfere with flow properties appreciably during fabrication.) with the soluble and fusible polyphenylenes, for subsequent curing therewith, this may be accomplished by proper control of the component relationship, as indicated. The soluble and fusible polyphenylene polymer compositions are also treated with a curing agent and partially polymerized with retention of solubility and subsequently provided as a redispersible and soluble resin or molding powder, in the manner hereinafter described.

As indicated, the soluble and fusible, branched, fully aromatic polyphenylenes useful in the present invention, have a mean carbon:hydrogen ratio of and about 1:5 being between 1:4 and 1:7, but more commonly being between 1.43 and 1.60, and owe their fusibility and tractability to the presence of phenyl, or biphenyl, and the like, branches as well as to a meandering configuration of their longest chains. Because of the existence of these branches and meandering configuration, the polymer molecule cannot attain a planar configuration as the completely para-polyphenylenes do and consequently close packing of the branched polymer molecules does not occur and the extremely strong van de Waals forces, which are present in the completely para polymer, are not observed. The tractable (soluble) and fusible polyphenylene polymers are preferably provided herein by the polymerization of biphenyl, terphnyls, quarterphenyls, branched isomers thereof, mixtures of the same, and mixtures of the same with phenylene oligomers or polyphenyls with less than 5 aromatic rings, by the process as herein exemplified and more specifically described and exemplified in the above application, incorporated herein by reference thereto.

The exceptional characteristics of the soluble and fusible branched polyphenylene resins of the present invention may be described in terms of four outstanding properties:

1. They have excellent thermal stability, exhibiting in the cured state, negligible weight loss between 400° – 500°C in an inert atmosphere. 2. They have mean molecular weights which range from about 500 up to 5,000 or more and as preferably utilized herein a mean molecular weight of and about 1,000 ± 500.

3. They are sufficiently soluble in certain common organic solvents, and particularly halogenated hydrocarbon solvents as the halobenzenes, di-halobenzenes, trihalobenzenes, trichloroethane, tetrachloroethane, chloroform, including toluene, and the like, especially when hot, to permit their use in lacquers and varnishes.

4. They are fusible and flow sufficiently at temperatures that are conventionally employed in hot molding presses to permit their fabrication in conventionally available equipment.

This unique combination of properties, coupled with their ease of preparation in good yield, constitutes a significant and major advance in the state of the art of fully aromatic polyphenylene resins. This unque combination of properties is the direct result of the proper choice, and proportion of reactants and of the proper choice and use of the catalyst and oxidant. In the co-pending disclosure, "Method of Providing Useful Heat-Setting Aromatic Polymer Resinous Compositions and Products, " Ser. No. 665,578, are described unique polyphenylene resin combinations and compositions which utilize the soluble and fusible branched polyphenylene resins as components of curable, or vulcanizable compositions which can be fabricated into useful coatings, molded and laminated structures. Structures produced in this manner include; electrical insulators, rocket nozzles, and structural materials which are required to withstand high temperatures, such as hyperthermal ablative conditions, or substantially high temperatures for long periods of time. Some commercial applications do not require the withstanding of such harsh conditions, and whereas it will be recognized that some of the herein modified polyphenylene composite resins may be likewise applicable, many of the essentially modified polyphenylene resinous compositions embodied herein are otherwise suitable for many conventional applications providing improvement and extending applicable uses of materials heretofore unavailable therefor.

I have now found that it is possible to fabricate, mold, and cure new composite resin material comprising the soluble, fusible branched polyphenylene resins which have heretofore been disclosed as moldable and curable with a curing agent therefor. As exemplified herein, such curing agent is an aromatic polymethylol, or derivative thereof, including an acid catalyst, effecting copolymerization or hardening of the polyphenylenes to an infusible and intractable useful resinous state. The curing agent may be exemplified as a xylylene glycol-p-toluenesulfonic acid telomer, or simply a mixture of the polyphenylene polymers and curing agent material prepared in-situ, in combination, with or without, tractable and/or intractable modifying material. Thus, I can now retain and utilize intractable polynuclear aromatic polymers such as para-polyphenylene or the intractable polyphenylene polymers produced as a by-product of the soluble, fusible, branched polyphenylene synthesis, in the composition or added thereto.

I have found that the soluble, fusible polyphenylenes previously disclosed can function as a reactive flux such as to permit the use of relatively large amounts of intractable polynuclear aromatic resins in the composite molding compositions of this invention to achieve good flow, homogeneity and other essential molding characteristics, the whole composite molding compositions being brought to a state of cure by the application of heat, or heat and pressure in the presence of the curing agent. The presence of the comparatively insoluble polyphenylene material, or other additive, may be in various useful portions, from minor to major, as desired to obtain the proper heat setting results and hardness desired.

I have unexpectedly found that although the polymethyol aromatic compound-acid curing agent cannot bring about satisfactory cure of the intractable polynuclear aromatic resin, the composite resins comprising the intractable polynuclear aromatic polymers or resin and the soluble, fusible, branched polyphenylene resin can be homogeneously cured by said curing agent in the same manner as said curing agent can cure the said soluble, fusible, brached polyphenylene resins above. I have further discovered that many of the heretofore thermoplastic resins and like material can be utilized with the thermosetting polyphenylene polymers to produce useful heatsetting compositions, with or without the inclusion of the insoluble polymeric material being present therein. As the soluble, fusible branched polyphenylene resins that may be employed in the present invention, I may use any of the soluble, fusible branched polyphenylenes disclosed in Ser. No. 349,770 (now abandoned), and the copending filed application, as indicated. The intractable polynuclear aromatic polymers that may be employed in the present invention and that are characterized by being substantially infusible and being insoluble in those solvents such as halogenated benzene, p-dioxane, chloroform, tetrachloroethane, toluene, trichloroethane, trichloroethylene, and the like, and particularly in heated or hot to boiling condition, in which the said soluble, fusible branched polyphenylenes are soluble. Such intractable polymers as parapolyphenylenes, or those by-product polymers which are substantially insoluble and infusible and separable from the soluble polymers, as described herein and in the indicated disclosures, may be added or inherently present in the soluble or fusible polymer mixtures.

As the curing agents that may be employed in the present invention, I may use compositions of the character described in Ser. No. 349,770 (now abandoned) and replaced by application Ser. No. 665,262, and application Ser. No. 665,308, filed therewith, in which I am co-inventor with Leroy J. Miller, or polyfunctional aromatic sulfonyl halide material as herein described and illustrated.

Illustrative of a base combination of polyphenylene polymers and curing agent in combinations with the intractable solids, which may be inherently present or added, is the following:

EXAMPLE 1

A polyphenylene polymer was prepared from 1.5 moles of meta-terphenyl and 1.5 moles of biphenyl using 2.3 moles aluminum chloride as catalyst and 6 moles cupric chloride as oxidant. The misture of monomers with the aluminum chloride was heated to about 165°C, to effect a fluid batch, and the oxidant was added in small portions over about a 1 to 2 hour period. Mixing and heating was continued for a period of about 3½ hours with the temperature maintained between 135° – 180°C. Preferably the crude product, after cooling, is ground to a powder and treated with hot concentrated hydrochloric acid (12 N) to remove the inorganic salts, by several washings, followed by several water washes. When cleaned, the solids are essentially soluble in a suitable solvent, for example, in hot to boiling halogenated solvent material of the character of the halobenzenes as chlorobenzene, bromobenzene, 1,2,4-trichlorobenzene, or chloroform, tetrachloroethane, and the like. This solution can be directly utilized herein. However, it is preferable to first extract the unreacted monomers, partially reacted monomers and extremely low molecular weight oligomers by treatment and washing with hot mixtures of naphtha and benzene or other suitable solvent. Such extraction mixtures are applicable per se to the curing process herein, with or without the solids contained therein as herein provided, naturally occurring, or added, with the resultant cured product being of lesser stability to extremely high temperatures, but satisfactory for some commercial useage. Further, although the residue therefrom, resoluble in a suitable solvent therefor, and with or without some insoluble polymers occuring therein, may be used herein, the preferred polyphenylene polymers, of a molecular weight preferably on the order of 1,000 ± 500 and up to about 2,000 are those which are obtained by solvent extraction of the residue from the first extraction. Such further extraction is effected with a hot halogenated solvent as trichloroethylene, chlorobenzene, or 1,2,4-trichlorobenzene, and the like, as disclosed in the co-pending application for "Commerically Useful Polyphenylene Polymers and Method of Production Thereof," Ser. No. 665,262, filed by Leroy J. Miller and myself, and the soluble and insoluble polyphenylene products therein, without removal therefrom are applicable to the process herein, to provide useful products, as indicated.

The following examples are given to illustrate the preferred process and indicate its application and use in preparing products of the present invention, discovery and disclosure:

EXAMPLE 2

300 grams of polyphenylene polymers having a melting range of 160°C – 180°C and a mean molecular weight of about 700 – 1,000 was dissolved in 600 ml. of trichloroethylene heated at its boiling point. A curing agent solution was prepared from 150 grams of p-xylyleneglycol, 45 grams of p-toluenesulfonic acid hydrate, and 500 ml. of chloroform by refluxing the components together for 20 hours while removing water in an azeotropic trap.

The polyphenylene solution and curing agent solution were mixed together and heated at reflux for 20 hours. After cooling, part of the lacquer was blended with para-polyphenylene in a high shear blended to yield a slurry containing approximately two parts of polyphenylenexylylene glycol solids by weight to one part of parapolyphenylene by weight. The mixed lacquer was then used as a varnish to coat dry carbon cloth (HITCO, CCA-1) which was then air dried and subsequently vacuum dried at 160°F for ten minutes.

The "pre-pregs" then contained 48 percent of polymer solids based on weight.

Twenty-one plies of "pre-preg" were then stacked and molded at 400°F and 500 psi for a period of two hours. The laminates then weighed 339 ± 1 gram and had 46 percent solids content. They were then postcured by heating for 18 hours at 275°F, followed by a programmed heat cycle for 108 hours with the temperature rising gradually from 275° – 550°F, and finally heated for six hours at 550°F. Laminates were cooled to 200°F in the post-cure oven before removing. The cured laminates each weighed 332 ± 1 gram and contained 45 percent resin solids by weight. Their densities were 1.30 ± 0.02. The cured laminates were homogeneous and the resinous binder therein had been converted into an insoluble and infusible material.

EXAMPLE 3

A branched polyphenylene-xylyleneglycol-para polyphenylene lacquer or varnish was prepared as in Example 2. The lacquer was then dried for 18 hours at ambient temperature then vacuum dried for 105 minutes at 160°F. The polymer mixture was then ground to a fine powder. 32 grams of the dried polymer was loaded into a press at 500°F and was molded for two hours at a pressure of 3,000 p.s.i. The molded specimen weight 31.8 grams. It was then post-cured, following the same procedure described in Example 2. The final weight was 30.3 grams. The final product was dense, glossy and completely cured to an insoluble and infusible material.

EXAMPLE 4

A polyphenylene-xylylenglycol lacquer or varnish was prepared as in Example 2, except that an intractable polyphenylene other than para-polyphenylene was used in place of para-polyphenylene. The lacquer was then dried for 18 hours at ambient temperature then vacuum dried for 105 minutes at 160°F. The polymer mixture was then ground to a fine powder. 32 grams of the dried polymer was loaded into a press at 500°F and was molded for two hours at a pressure of 3,000 p.s.i. The molded specimen weighed 31.8 grams. It was then postcured following the same procedure described in Example 2. The final weight was 30.2 grams. The final product was dense, glossy and completely cured to an insoluble and infusible material.

From the above it will be recognized herein that the soluble and fusible polyphenylene polymers, as utilized herein, are polymers of polymerized monomers selected from the group consisting of biphenyl, ortho- and meta-terphenyls, the 2,2'-, 3,3'-, 2,3'-, 2,4'-, 3,4'-, diphenyl biphenyls, the 1,2,3-, 1,2,4-, and 1,3,5-triphenylbenzenes, mixtures thereof, and mixtures thereof with other phenylene oligomers and polyphenyls with not more than five aromatic rings.

With reference to such soluble and fusible polyphenylene polymers, a mixture thereof can be prepared with the modifying or modified material, in a solvent or dry state, and the curing agent subsequently added, in a solvent or dried state. Initially, it may be desirable to mix the soluble and fusible polyphenylenes with the curing agent material and subsequently adding the modifying or modified material, with the soluble and fusible polyphenylenes in an unreacted or partially reacted state, and in a dry or wet state. Whereas, for better homogeneity, the described processing as described is preferred suitable and satisfactory compositions for other or less stringent application may be obtained. Such mixtures preferably provide usable resinous compositions of soluble and fusible polyphenylenes having a carbon to hydrogen atomic ratio between 1.4:1 to 1.7:1, a melting range of about 120° – 300°C, and a mean molecular weight range of 1,000 ± 500 to about 3,000 in combination with higher molecular weight aromatic polymers of over 3,000 molecular weight and preferably in essentially fusible and soluble or dispersible combination with a thermosetting curing agent for said soluble and fusible polyphenylenes.

Although it is preferred to utilize the polyphenylene in polymer form, and the curing agent comprising an aromatic polymethylol material in combination with a polymerization catalyst in the prepolymer form, as above described, the monomer combination of aromatic polymethylol material and acid catalyst may be mixed with either the soluble polyphenylene polymers or the aromatic monomers forming said polymers, and reacted in-situ, with constant removal of water, to obtain an inferior but useable soluble product which can advantageously be modified, as described herein, or used to modify a thermoplastic to a thermosetting composition by admixture therewith in liquid, plastic, or powder form. In addition to the otherwise relatively insoluble and infusible aromatic resin-forming material as exemplified by the para and other polyphenylenes, such other modifying or modified materials as soluble or intractable and insoluble polymers of polyphenylene sulfide, polyphenylene oxide, Wurtz-Fittig type polyphenylenes, as known to the art and referenced in the herein noted Ellis publication, polyphenylenes from radiation polymerization of aromatic compounds, soluble and insoluble, highly aromatic natural or synthetically prepared tars or coal tar pitch, and other natural or synthetic resins as polystyrene, terephenes, benzoin, vinyl compounds, resinamines, or amino resins, natural resins, and the like, or resin-formed materials of aromatic acids and esters, are applicable by substitution, in proportion of the whole or in part, or in equivalent proportional amounts of the indicated solids addition, to the soluble polyphenylene polymer material and curing agent combination. With or without the presence of such added or inherently present insoluble solids and other modifying or modified material, as described when mixed with the fusible and tractable polyphenylene polymers, care is necessarily taken to maintain the solution or reaction phase between the soluble and fusible polyphenylene polymers and curing agent for subsequent heat curing thereof and solidification of the composite mixture. Such composite mixtures are directly useful, in solvent, powder, or plastic form. As indicated, the curable solution, fusible polyphenylene polymers and curing agent compositions, as described, may be modified in incorporating various thermosetting or thermoplastic polymers, as synthetic rubbers, isobutene resins, polystyrene, and the like, including mixtures of modifier materials with or without the para polyphenylene and the like solids in solution, dispersion or powder form therewith, thus increasing the thermoplastic's resistance to heat and improving the hardness and heat resistance of the thermoplastic or conversely reducing the hardness of the cured polyphenylene composition dependent upon the relative proportions of the modifier material added to the solution or powder mix before heat setting.

The above additive polymers of synthetic and natural occurrence are well known to those of skill in the art as found in the background of thousands of pages of literature found in the publications of Ellis on *The Chemistry of Synthetic Resins* starting with Vol. 1 in 1935, including thousands of cross-references to other literature and the Intra-Science publication of Brand, Rupt and Immergut, *Polymer Handbook*, copyright 1966. As herein described, the aromatic natural or synthetic thermoplastic pitches and tars are usually polymer mixtures of biphenyl, terphenyl, quatraphenyl, hexaphenyl, and the like, compounds which may contain some naphthylene, anthracene, phenanthracene, or homologues and substituted derivatives thereof in varying amounts dependent upon the origin and source. Such materials are believed to be also reactive with the curing agent material to convert the composite mixtures to a thermoset state. Accordingly, such tars and pitches may be present in amounts from a small percent to over 90 percent, and up to 100 percent with a portion being polyphenylenes, upon care and selection for the results desired. Such natural and synthetic polymer mixtures are commercially available as aromatic pitch or tar material and derived from natural sources as oils, tar, coal and the like, or as synthetic products in the synthesis of aromatic hydrocarbons.

The curing agent portion of the above typical composition is preferably a prepared prepolymer solution formed by reacting an aromatic non-phanolic polymethylol compound with an acid catalyst preferably of an aromatic character of one or more of the sulfonic acids, as p-toluenesulfonic acid, benzenesulfonic acid, cyclohexane-sulfonic acid, and mixtures thereof, including mixtures with less preferred acids. Less preferably, there may be employed such acids as phosphoric acids, alkylphosphonic acids, arylphosphonic acids, alkylphosphonous acids, arylphosphonous acids (note publication of John R. Van Wazer "Phosphorous and Its Compounds"), sulfuric acid, strong alkyl- and arylcarboxylic acids, particularly halogenated derivatives of these acids, and mixtures of such acids in an appropriate relationship of initial polymerization and subsequent cure, as described. For example, sufficient strong acid may be used to effect initial condensation polymerization with subsequent cure, without addition of more acid catalyst material, or use of a weaker condensation catalyst initially, with addition of a stronger catalyst for curing, or a combination of such catalysts as desired.

Essentially, the condensable aromatic curing agent material, as indicated, is a polymethylol aromatic compound having the structural formula

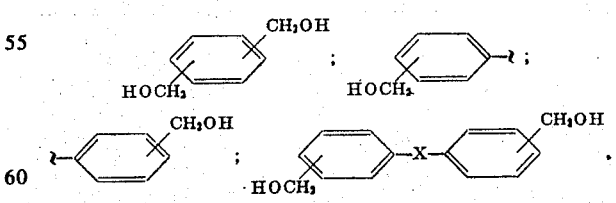

wherein X is selected from the group consisting of oxygen, sulfur,

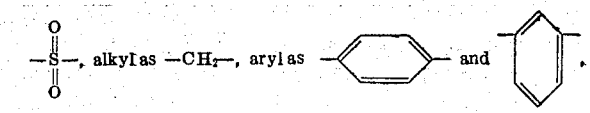

and the like, including mixtures of the same, as disclosed in the copending application for "Resinous Curing System And Method" Ser. No. 665,303 of Leroy J. Miller, and in which I am co-inventor. The additional ring substituents may be sterically non-interfering hydrogen, alkyl, aryl, alkaryl, aralkyl, alkoxy, aryloxy, partially halogenated derivates thereof.

The above examples are illustrative of a preferred method of application of mixtures utilizing a typical and preferred type polyphenylene prepolymer solution, others of which may be prepared by substitution of aromatic polymethylol monomers and acid catalyst, or polymers thereof, and mixtures of the same, having incorporated therewith the solids and/or other modified or modifying plastic resin-forming material, in the manner as described, illustrated and embodied herein. As indicated, the curing agent is preferably prepared as a prepolymer, such as a polyoxyxylylene, derived from the above compounds by reaction with an acid, as herein indicated and described in the above application which is included herein by reference thereto.

In further exemplification of a new use for the soluble and fusible aromatic polymers herein described, and also soluble and fusible aromatic polyphenylene polymers of anthracene, naphthalene, phenanthrene and modifications thereof with biphenyl, terphenyl, quaterphenyl compounds, mixtures of the same and mixtures thereof with other aromatic monomers, oligomers, or polymers of not more than 5 aromatic rings, which are curable with aromatic polymethylol and acid catalyst, polymethylol derivatives thereof, and aromatic polyfunctional sulfonyl halides, as 1,3,5-benzenetrisulfonyl chloride, parabenzene disulfonyl chloride, 3, 4' biphenyl disulfonyl chloride, sulfonyl bromides, sulfonyl fluorides, and the like, (as described in my copending application entitled "METHOD OF PREPARING THERMOSETTING PLASTICS AND PRODUCT," Ser. No. 665,302, now abandoned, included herein by reference thereto). Or mixtures of the polyfunctional curing agents, and mixtures thereof with the polymethylol and acid catalyst combination may be used as curing systems with the polyphenylene polymers; which polymers can be modified by, or provide modification of, synthetic or natural thermoplastic and thermally unstable polymeric material of the character obtained in the preparation and synthesis of hycrocarbons including such materials as "pitch plastics", coumarone polymers, indene polymers, polystyrene, coal tar pitch, earth and mineral asphalt and bituminous material, mixtures thereof, and the like, as shown by the following:

EXAMPLE 5

Polyphenylene (40 g., m.w. 1000, m.p. 160°-200°C) and aromatic coal tar pitch was dissolved in p-dioxane (150 ml.). To the hot solution was then added a solution of curing agent derived from 1,4-xylyleneglycol (20 g.) p-toluenesulfonic acid monohydrate (6 g.) and chloroform (150 ml.). The curing agent solution had been heated at reflux for 20 hours while removing water continuously before addition to the polyphenylene solution. The combined polyphenylene-xylyleneglycol solution was then heated at 70°C for 6 hours. It weighed 381 g. and contained 21 percent solids when finished. This lacquer was found to be suitable as a varnish useful on fiber reinforcements to be used in filament winding applications.

EXAMPLE 6

A curing agent solution was prepared by reacting p-xylyleneglycol (30 g.), p-toluenesulfonic acid hydrate (9 g.), and chloroform at reflux for 20 hours while stirring and removing water continuously. This solution was then added to a solution of polyphenylene (60 g., m.w. 1,000, m.p. 160°-200°C), and aromatic coal tar pitch (30 g.), in trichloroethylene (180 ml.). The combined solution was then heated at reflux for 20 hours to yield 649 g. of lacquer containing 18.5 percent solids.

EXAMPLE 7

A curing agent solution was prepared in telomer form from recrystalized (p-xylyleneglycol 50 g.), p-toluenesulfonic acid hydrate (16 g.) and chloroform by heating the stirred mixture at reflux for 20 hours while removing water continuously. Chloroform was then removed under vacuum while keeping the temperature below 50°C. The solid telomer was then redissolved in dioxane.

The above solution was then mixed with a solution of polyphenylene (60 g., m.p. 140°-182°C, C:H atom ratio 1.57, m.w. about 1,000), aromatic coal tar pitch (40 grams) and p-dioxane (200 ml.). The combined mixture was then heated at 70°C for 3½ hours to yield 826 g. of lacquer with 18 percent solids content.

Otherwise, as above described, a combination of the polyphenylene material can be prepared with or without the inclusion of intractable and insoluble, or relatively inert material, and a polyfunctional curing agent with a modifying thermoplastic resinous material as illustrated by the following:

EXAMPLE 8

A mixture of soluble polyphenylene material of a mean C:H atomic ratio on the order of 1.4 to 1.7 and in monomer and polymer form (about 20 grams) with 1,3,5-benzenetrisulfonyl chloride (about 10 grams) was dissolved in hot chloroform and an aromatic pitch plastic comprised of a mixture of benzyl, phenyl or phenylene polymers was added (about 10 grams) and the mixture heated for a period of about 5–10 hours at reflux temperature (about 61°C). This prepared solution, in lacquer form, served as an impregnate and coating composition and sealant. Upon heat setting in a temperature range of about 275°F to about 550°F, the solids of the lacquer composition were converted or copolymerized to a thermoset relatively insoluble state. Normally, the different curing agent polymer combinations will require their own reaction temperatures and heat setting temperatures as is recognizable to those skilled in the art.

Further solutions of the above and similar and equivalent thermoplastic additives as polystyrene and the like were prepared and utilized as laminating impregments as exemplified in Example 2. In preparation of the soluble components, as a molding composition, the solvent was removed with care being taken not to complete copolymerization or "setting" of the solvent soluble polymers. The resoluble dried polymers were ground to a relative powder form which was moldable, as is, with or without the addition and mixture of filler material as inert conventional material or synthetic fibers, ceramic material, metal oxides, and the like. For additional aid in effecting the initial reaction with retention of solubility, less of the curing agent material may be used and for the final curing reaction, more curing agent can be added or mixture provided of the polymethylol and acid catalyst combination therewith.

When the combination of polymethylol and acid catalyst are added, it is preferably in a prereacted or prepolymer form of $XO - CH_2RCH_2O -_n X$ wherein R is one or more fused or unfused aromatic ring group or groups derived from a characteristic formula $HOCH_2RCH_2OH$ wherein R is the same or different ring group. Two or more $CH_2OH$ groups may be on the same or different ring structure and X is a combination of hydrogen and acid moiety minus the OH group or a combination of acid derivatives minus the OH group derived from an acid material as heretofore described.

The above examples are illustrative of modifications of either or both the fused and unfused aromatic ring compounds in combination with a thermoplastic material and curing agent to provide new useful soluble and fusible thermosetting resin compositions convertible to thermostable resins. The substitution of components and solvents as enumerated herein, temperature and times of reaction and curing cycle will vary dependent upon the particular mixture and end results desired by the operator, as is now recognizable to those skilled in this art. As it will now be recognized, the aromatic monomers forming the aromatic fused and unfused polyphenylene polymers may, less preferable, be mixed with the curing agent material, in monomeric form, for effecting an in-situ reaction of partial cure, preferably with retention of solubility and fusibility, for subsequent cure to a more heat resistant and thermally stable state. In either event, the mixtures, as herein provided are interpolymerized to a partially cured fusible, soluble copolymer state and finally to a more heat resistant cured copolymer state, as desired. The relative proportions of admixture of components are dependent upon the relative end use results desired or required with respect to final hardness, softness, tackyness, or flexibility of the relatively plasticized aromatic polyphenylene or the increase in thermal stability of the thermoplastic material. Incorporated with the compositions herein provided may be inert inorganic or organic filler material and mixtures thereof of a conventional character, including, for example, natural and synthetic rubber material, cellulosic material, synthetic fiber material, metal oxides, siliceous material and the like.

Having described the present embodiments of my discovery and improvement in the art, in accordance with the constitutional grant and the Patent Statute, it will be made within the scope of this disclosure without departing from the spirit and embodiment thereof. The specific embodiments above described are given by way of examples illustrative of my invention, discovery, and improvement, which is to be limited only by the terms of the claims.

What is claimed is:

1. The method of preparing a modified curable resinous composite of soluble and fusible polyphenylene polymers having a mean carbon:hydrogen atomic ratio on the order of 1.4:1 to 1.7:1 and essentially soluble in hot to boiling halogenated benzene, p-dioxane, chloroform, tetrachloroethane, toluene, trichloroethane or trichloroethylene heated solvent material and containing comparatively intractable and infusible polyphenylene polymer solids which are substantially insoluble in the said heated solvent for said soluble and fusible curable polyphenylene polymers comprising the steps of:
   1. preparing a mixture of said soluble, fusible polyphenylene polymers having a mean molecular weight on the order of about 500 to about 3,000, in combination with
   2. a curing agent therefor selected from the group consisting of a combination of an aromatic polymethylol compound having the structural formula

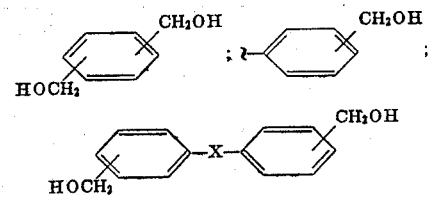

wherein X is selected from the group consisting of oxygen, sulfur,

alkyl, aryl, and including such compounds having additional ring substituents of sterically non-interfering hydrogen, alkyl, aryl, alkaryl, aralkyl, alkoxy, aryloxy, and partially halogenated derivatives thereof, and mixtures of the same containing a heat reactive polymerization affecting acid catalyst material selected from the group consisting of one or more of the aromatic sulfonic acids, phosphoric acid, alkylphosphonic acids, arylphosphonic acids, alkylphosphorous acids, arylphosphorous acids, sulfinic acid, alkyl- and arylcarboxylic acids, and halogenated derivatives of these acids, or a polyfunctional aromatic sulfonyl halide, and mixtures of said curing agents which on heating effect copolymerization of said soluble and fusible polyphenylene polymers with said aromatic polymethylol compound or with said aromatic sulfonyl compound;
   3. incorporating in said mixture polyphenylene polymer solids which are insoluble in said heated solvent;
   4. blending said mixture of soluble and insoluble polymers, and
   5. recovering a composite mixture of said soluble and fusible polyphenylene polymers containing said insoluble polymer solids and curing agent combination coreactive and heat setting in a temperature range on the order of 275° – 550°F.

2. The method of claim 1, including the steps of preparing the mixture in a said hot solvent for said soluble polyphenylene polymers, partially reacting the said polymers and curing agent with retention of their solubility in said solvent, removing the solvent without substantial further cure, and grinding the solids and uncured polymers to a powder form.

3. The method of claim 1, including the step of adding additional soluble or insoluble organic or inorganic modifying material to said mixture.

4. The method of claim 2, including the steps of removing the said solvent from the said mixture, powdering the said solid, molding the said powder and heat-curing the mixture.

5. The method of claim 2 wherein the preparation in Step 1 and Step 2 includes heating the mixture of soluble polymers of polyphenylene and curing agent solution at reflux temperature and effecting reaction of said hot solvent soluble polymers and curing agent with greater homogeneity for the insoluble polymers of Step 3.

6. The method of claim 1 wherein the said preparation includes the steps of cooling the mixture of Steps 1, 2 and 3, and blending the mixture of infusible polymer solids therewith in a high shear blender.

7. The method of claim 1 wherein the said insoluble polyphenylene polymers are essentially parapolyphenylene.

8. The method of claim 1 wherein the soluble polyphenylene polymers of Step 1 have a mean molecular weight of about 500 to about 2,000 and are soluble in a said hot halogenated hydrocarbon solvent.

9. The method of claim 1 wherein the curing agent comprises a xylylene glycol-p-toluenesulfonic acid telomer.

* * * * *

PO-1050
(5/69)

UNITED STATES PATENT OFFICE
CERTIFICATE OF CORRECTION

Patent No. 3,758,630            Dated September 11, 1973

Inventor(s) Norman Bilow

It is certified that error appears in the above-identified patent and that said Letters Patent are hereby corrected as shown below:

Cover page, [21], Appl. No. 194,779 should read:

Appl. No. 104,779

Signed and sealed this 23rd day of April 1974.

(SEAL)
Attest:

EDWARD M. FLETCHER, JR.　　　　　　　　　C. MARSHALL DANN
Attesting Officer　　　　　　　　　　　　　　Commissioner of Patents